(12) United States Patent
Weise et al.

(10) Patent No.: US 6,831,227 B2
(45) Date of Patent: Dec. 14, 2004

(54) JUNCTION BOX

(76) Inventors: Gary K. Weise, 1700 Barcelona Cir., Placentia, CA (US) 92870; Richard J. Kesl, 1700 Barcelona Cir., Placentia, CA (US) 92870

(*) Notice: Subject to any disclaimer, the term of this patent is extended or adjusted under 35 U.S.C. 154(b) by 280 days.

(21) Appl. No.: 10/072,477

(22) Filed: Feb. 7, 2002

(65) Prior Publication Data

US 2003/0080123 A1 May 1, 2003

Related U.S. Application Data

(63) Continuation-in-part of application No. 10/004,129, filed on Nov. 1, 2001.

(51) Int. Cl.[7] ................................................ H01H 9/02
(52) U.S. Cl. ........................... 174/58; 174/60; 174/135; 220/4.02; 439/535
(58) Field of Search ............................. 174/50, 58, 60, 174/135; 220/3.8, 4.02; 439/535; 248/906

(56) References Cited

U.S. PATENT DOCUMENTS 6,521,833 B1 * 2/2003 DeFreitas .................. 174/65 R

* cited by examiner

Primary Examiner—Dhiru R Patel
(74) Attorney, Agent, or Firm—Terry L. Miller (57) ABSTRACT

An improved, non-conductive electrical junction box assembly includes a junction box body defining at least one insert recess; and an insert member slidably received into the insert recess, defining a stepped through bore, and outwardly providing a conduit socket into which an end termination portion of an electrical conduit may be received and secured. The insert member may be adhesively secured into the insert recess, or the insert member and junction box body may include mutual latching features which engage upon insertion of the insert member into the insert recess to lock the insert member in the insert recess. Alternatively, the insert member and the insert recess may each have a portion that is generally T-shaped, and these portions may receive and engage one another to position the insert member on the junction box body. A latching feature may be included in the T-shaped insert member, and the junction box body may include features allowing unlatching and removal of the insert member.

15 Claims, 10 Drawing Sheets

JUNCTION BOX

CROSS REFERENCE TO RELATED APPLICATION

This application is a Continuation-in-Part of U.S. patent application, Ser. No. 10/004,129, filed Nov. 1, 2001, the disclosure of which is incorporated herein to the extent necessary for a complete enabling disclosure of the present invention.

BACKGROUND OF THE INVENTION

1. Field of the Invention

This invention is in the field of protective enclosures for electrical wiring (i.e., junction boxes). More particularly, this invention relates to a non-conductive junction box for electrical wiring and related electrical components. Junction boxes are generally manufactured and supplied to the trade in industry-standard sizes and configurations. Some conventional junction boxes are made entirely or partially of conductive metallic material, but increasingly the electrical trade, and especially some particular applications such as electrical wiring in wet environments, call for junction boxes that are formed entirely of non-conductive materials.

2. Related Technology

Generally, electrical wiring terminations and electrical components are installed within protective junction boxes in both residential and industrial environments. Typically, such electrical components and wiring terminations must be installed into and attached to a junction box so as to provide proper spacing between components, to provide environmental protection to the wiring terminations and components, and to prevent inadvertent contact with the wiring and components, for example, by people or animals. An important consideration is that a junction box be as spacious inside as is practicable for a particular size class in order to provide adequate room for the wiring terminations, and also be very flexible in the methods allowed for routing wires and conduits to and from the junction box.

Another consideration with junction boxes is the size or sizes of electrical conduits that are to be connected with the junction box. Conventional junction boxes generally allow only a single size of electrical conduit to be connected to a particular junction box. Some junction boxes will accept connection of a couple of different sizes of electrical conduits, or require the use of adapters or reducer bushings to facilitate connection of more than one or two different sizes of electrical conduits. Consequently, installers of electrical junction boxes and wiring must carry to job sites a great multitude of different sizes and configurations of conventional junction boxes so that they can be sure of having what they need for a particular job.

Over the years there have been many types of electrical junction boxes developed, some for specialized usage and others for more generalized purposes, often with a view to both low cost of manufacture and to economy of use. The main purposes of such junction boxes have been to provide environmental protection for wiring terminations and electrical components installed in the boxes, while also preventing inadvertent contact by humans and animals with this wiring and electrical components.

Junction boxes have been designed in many and varying shapes and sizes, but have these above-described conventional considerations and functions in common. Many junction boxes are made to industry standard or to trade standard sizes. Earlier, junction boxes were generally constructed of metal and had only preformed knockouts for the attachment of conduits. When the electrician or installer found it necessary to have a hole for wire or conduit access to a junction box, this installer used a tool, such as either a punch or screwdriver, to remove a preformed knockout.

More recently, junction boxes have been constructed of plastics, or a mix of metals and plastics, and provide a wide variety of configurations for standard and for specialized uses. Conventional junction boxes which may be relevant to this invention include those set out in the following United States patents:

U.S. Pat. No. 5,169,013, issued 8 Dec. 1992, to Albert Lammens, Jr.;

U.S. Pat. No. 5,216,203, issued 1 Jun. 1993, to Edward E. Gower;

U.S. Pat. No. 5,352,850, issued 4 Oct. 1994, to Trevor W. Norris;

U.S. Pat. No. 5,541,363, issued 30 Jul. 1996, to Gary K. Weise, et al. (a named coinventor on the present application);

U.S. Pat. No. 5,828,001, issued 27 Oct. 1998, to Jan J. Schilhiam;

U.S. Pat. No. 5,936,200, issued 10 Aug. 1999, to Mike K. Park; and

U.S. Pat. No. 5,942,726, issued 24 Aug. 1999, to Kenneth Reiker.

A significant disadvantage of conventional junction boxes results from their comparative inflexibility of configuration, installation, size expansion capability; and particularly limitations with respect to inflexibility for routing and attachment of electrical conduits.

SUMMARY OF THE INVENTION

In view of the deficiencies of the conventional related technology, it is an object of this invention to overcome one or more of these deficiencies.

This invention provides a molded non-conductive plastic junction box that has an interior volume which is larger than that of conventional junction boxes of the same exterior size. The present inventive junction box has a back wall and four contiguous side walls, each joined both to the back wall and to it's two contiguous side walls. The side walls are arranged in spaced apart opposite pairs and each side wall terminates at an end edge in a common plain with the other side walls to cooperatively define an opening into the box. This opening is used to insert components and wiring into the box and may be overlaid with a cover plate to provide a dry, non-corrosive, and economical enclosure.

The junction box includes mounting lugs adjacent to this opening for securing a cover plate to the box as well as for securing at least one electrical component inside the box. These mounting lugs extend from the plane of the junction box opening toward but short of the back wall of the box in order to provide increased interior volume for the junction box. Also, the wall portion of the junction box inwardly of the termination of these mounting lugs (i.e., toward the back wall of the box) provides additional wall space to which conduit sockets may be mounted, if desired.

The present inventive junction box body includes a unique insert member, which is receivable into an insert recess of the junction box, and which insert member defines one or more conduit sockets at which conduits may be coupled to the junction box body. Thus, by using a certain size of junction box body, and having a variety of different sizes and configurations (i.e., single, or double conduit sockets, for example) of insert members, an installer is able to make at a job site a wide variety of different junction box assemblies. This combination of features results in a greater utility for the junction box combinations, reduced costs, and reduced storage space and inventory size requirements for the inventive junction box assembly, when compared to those requirements for conventional junction boxes offering the same installation possibilities.

Accordingly, according to one embodiment, this invention provides an electrical junction box, this junction box comprising: a molded plastic junction box body including a back wall, and plural contiguous walls extending generally perpendicularly to the back wall, and each one of the plural contiguous walls joining integrally to the back wall and also to adjacent ones of the plural contiguous walls to cooperatively define a chamber within the junction box, with the plural contiguous walls at respective end edges cooperatively forming an opening to the chamber; at least one wall of the junction box body defining an insert recess for slidably receiving an insert member which carries at least one conduit socket into which a termination portion of an electrical conduit may be secured.

Other objects, features, and advantages of the present invention will be apparent to those skilled in the art from a consideration of the following detailed description of two exemplary preferred embodiments of the inventive junction box, when taken in conjunction with the appended drawing Figures. In these appended drawing Figures, features which are the same or which are analogous in structure or function are indicated by the same reference numeral throughout the several views.

DETAILED DESCRIPTION OF EXEMPLARY PREFERRED EMBODIMENTS OF THE INVENTION

Figure 1:
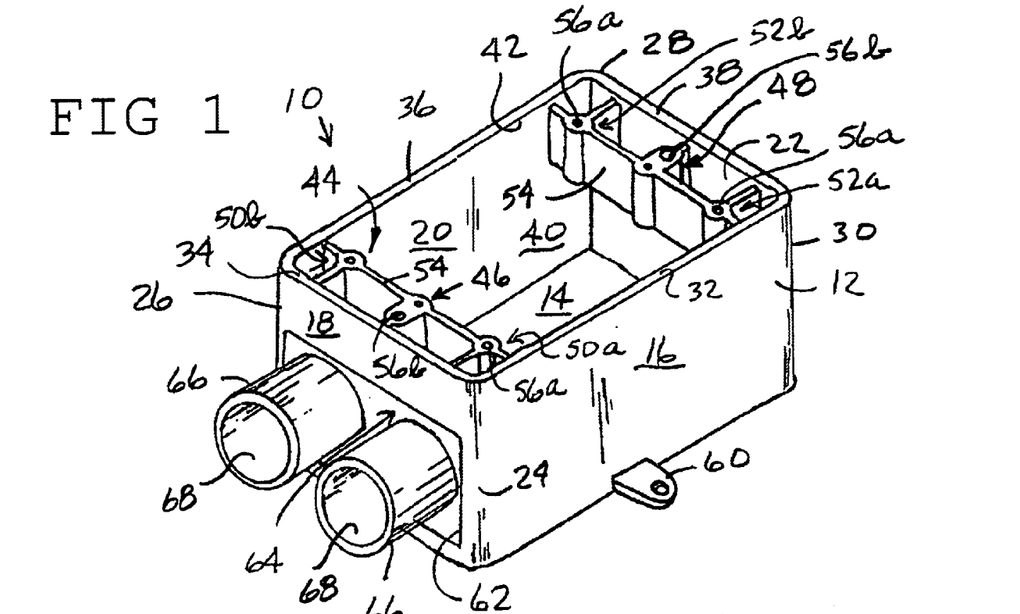
FIG. 1 is a perspective view of a junction box assembly embodying the present invention with a junction box body having an insert member installed which defines a pair of adjacent conduit sockets.

Attention now to FIGS. 1–8 in conjunction, and viewing first FIG. 1, will reveal a junction box assembly 10 embodying this present invention. This junction box assembly 10 provides a high-volume, high-utility, non-conductive enclosure (i.e., a junction box) for the placement of electrical components and wiring. In FIG. 1 the junction box assembly 10 can be seen to include a junction box body 12, which is a chambered prismatic body formed of non-conductive plastic material. More particularly, the body 12 may preferably be injection molded of polyvinyl chloride (PVC), or of other thermoplastic or thermoset polymer materials known in the art. The body 12 includes a back wall 14, and plural (i.e., at least four) contiguous walls 16, 18, 20, and 22 which are generally perpendicular to the back wall 14. The contiguous walls 16–22 are joined integrally to the back wall 14, and are each also integrally joined to each of the two adjacent ones of the plural walls 16–22. Thus, these walls 16–22 are arranged in opposing pairs of generally parallel walls, and the adjacent walls are integrally joined to one another to form corner junctions 24, 26, 28, and 30.

Further to the above, the walls 16–22 are arranged in opposing generally parallel pairs so that they form a pair of side walls 16, 20; and a pair of end walls 18, 22. Each of the walls 16–22 has a respective termination edge or end edge 32–38, which end edges are all substantially in a common plane. The walls 14–22 of the junction box 10 cooperatively bound a cavity 40, and also cooperatively define an opening 42 to this cavity 40 within junction box 10. The end edges 32–38 circumscribe this opening 42. In other words, the opening 42 provides access to the cavity 40 formed within the junction box 10 by the cooperation of the back wall 14 and the side walls 16–22.

Figure 2:
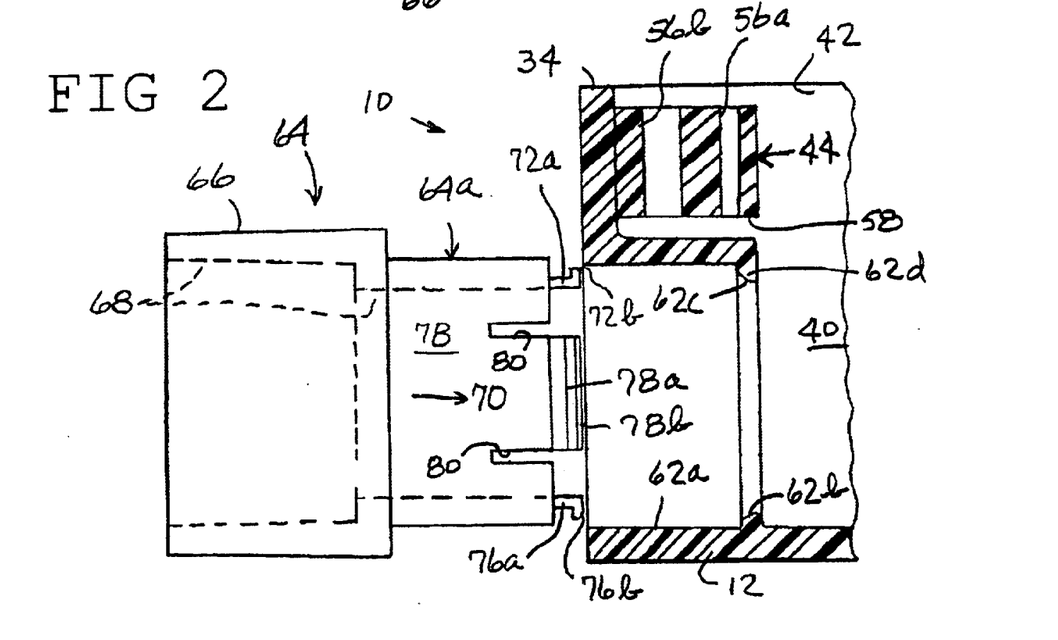
FIG. 2 provides a side elevation view, partly in cross section, of the junction box body and insert member seen in FIG. 1, but these parts are shown at a preparatory stage of assembly.

Turning now to consideration of FIGS. 1 and 2 in greater detail, it is seen that the junction box 10 also includes a plurality of inwardly extending ganged (or interconnected) mounting lugs generally indicated at 44. The use of these mounting lugs will be familiar to those ordinarily skilled in the pertinent arts. However, it is seen that these mounting lugs include a pair of center mounting lugs 46, 48 (one centered on each end wall 18, 22); and four side mounting lugs 50a, 50b, 52a, and 52b (arranged two on each end wall 18, 22 adjacent to the corners of the box). Each of the mounting lugs 46–52b is connected to the other mounting lugs at that end of the junction box 10 by an integral web 54, and is cantilevered from a respective one of the end walls 18, 22, and/or from side walls 16, 20. Each mounting lug 44 is provided with at least one screw hole 56a, and also possibly with a guide hole 56b. Those ordinarily skilled in the art will recognize the screw holes 56a as being usable for securing an electrical component within the cavity 40, or for securing a cover plate at the opening 42. Moreover, the center mounting lugs 50, 52 are each also provided with a guide hole 56b, which by receiving a guide pin on a standard ground fault interrupter allows such an interrupter to be installed in a certain position within the junction box 10.

As is seen in FIGS. 1 and 2, the mounting lugs 46–52b each extend from substantially the level of the opening 42 (i.e., substantially coplanar with the end edges 32–38) inwardly of the box (i.e., inwardly of cavity 40) toward the back wall 14. However, all of the mounting lugs 46–52b stop short of the back wall 14. That is, each of the mounting lugs 46–52 defines a respective termination surface 58, which is disposed toward but spaced from the interior surface of back wall 14. As a result, the termination surfaces 58 of mounting lugs 46–52b are all spaced away from the back wall 14 to better provide an increased interior volume for the junction box 10.

Provided on each side wall 16 and 20, is one of a pair of outwardly extending mounting ears, 60, only one of which is visible in the illustration of FIG. 1. The mounting ears 60, each by providing for a screw to pass therethrough, allow the junction box assembly 10 to be secured to an underlying surface (not seen in the drawing Figures).

Figure 3:
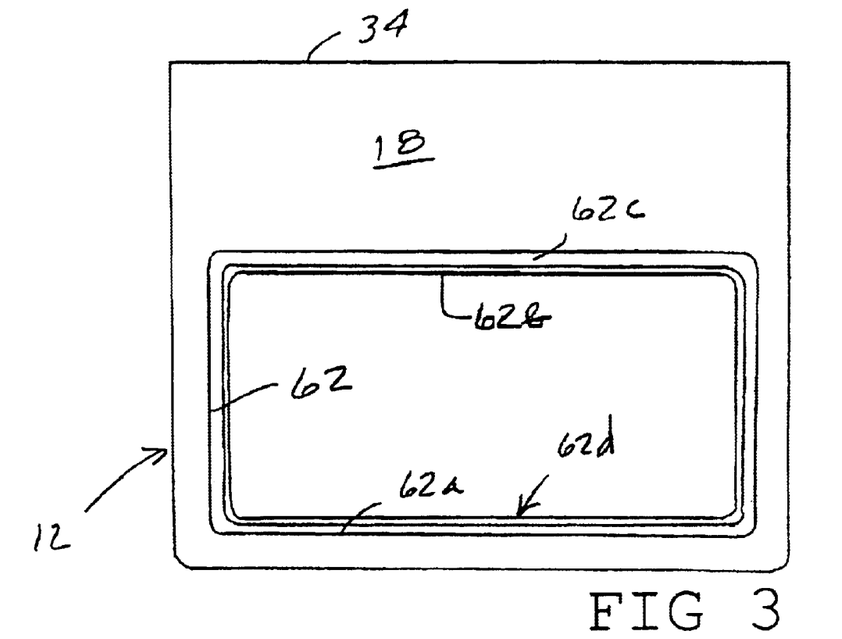
FIG. 3 provides an end elevation view of the junction box seen in FIGS. 1 and 2, but without the insert member installed.

Further to the above, the end wall 18 closest to the viewer of FIG. 1 defines a generally rectangular insert recess 62, best seen in FIGS. 2 and 3. This insert recess 62 is defined only in wall 18 according to the embodiment illustrated in FIG. 1, although the invention is not so limited. In other words, in addition to or instead of the wall 18 defining an insert recess 62, any one or all of the other walls 16, 20, or 22 may define a similar insert recess. Further, the back wall 14 may even define an insert recess for receiving an insert member. The insert recess (or each of plural insert recesses) 62 receive an insert member, as will be explained further.

As is best seen in FIGS. 2 and 3, the insert recess 62 is generally rectangular in end elevation view (FIG. 3) and includes a larger sized portion 62a, a smaller sized portion 62b, and an outwardly disposed chamfered shoulder 62c defined by the cooperation of portions 62a and 62b. The portion 62b is defined by a peripheral flange 62d which inwardly defines a latching surface 62e.

Figure 5:
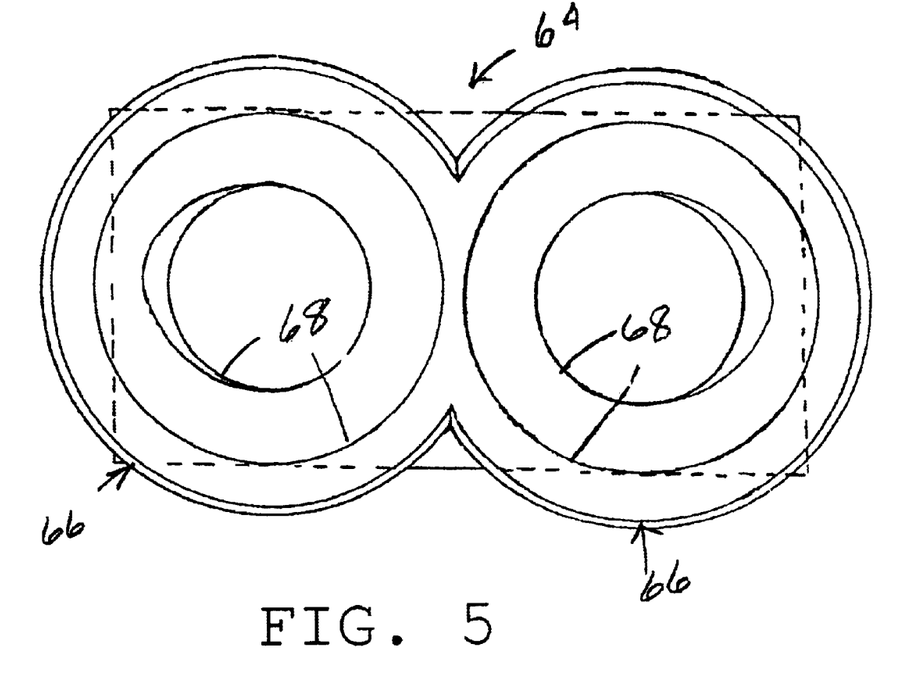
FIG. 5 is an end view of the insert member as seen in FIG. 4.
Figure 6:
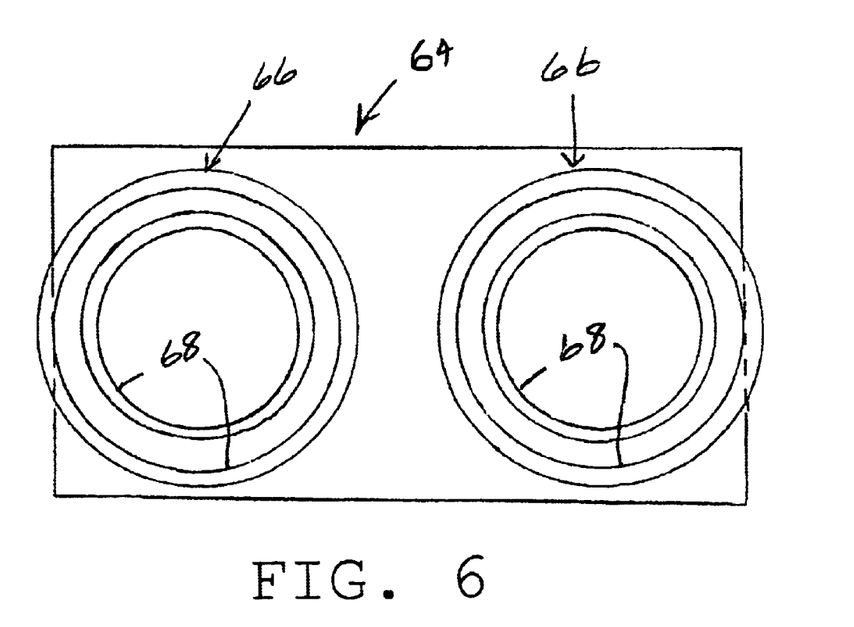
FIG. 6 is an end view of an insert member similar to the one seen in FIG. 5, but providing a different size of conduit sockets.

In FIG. 1, an insert member 64 is shown received into the insert recess 62. This insert member defines at least one outwardly extending cylindrical protrusion or boss 66. The boss 66 defines a stepped cylindrical through bore 68, which is sized and configured to adhesively receive in an outer and larger diameter portion thereof an end portion of a plastic (i.e., PVC, perhaps) electrical conduit (not shown in the drawing Figures). That is, the cylindrical bore 68 at an outer part thereof provides an outwardly disposed conduit socket, also indicated with the numeral 68. As is seen in FIG. 1, the insert member 64 may define a pair (or more) of conduit sockets in side-by-side relationship. It will be also understood that the insert member 64 may define only a single conduit socket, or none at all (in which case the insert member would simply be for closing the insert recess 62). FIGS. 5 and 6 illustrate that the bosses 66 may be separated and spaced apart (FIG. 6); or that they may be larger, may define larger conduit sockets, and may be joined partially together (or be siamised), as is seen in FIG. 5.

Figure 2A:
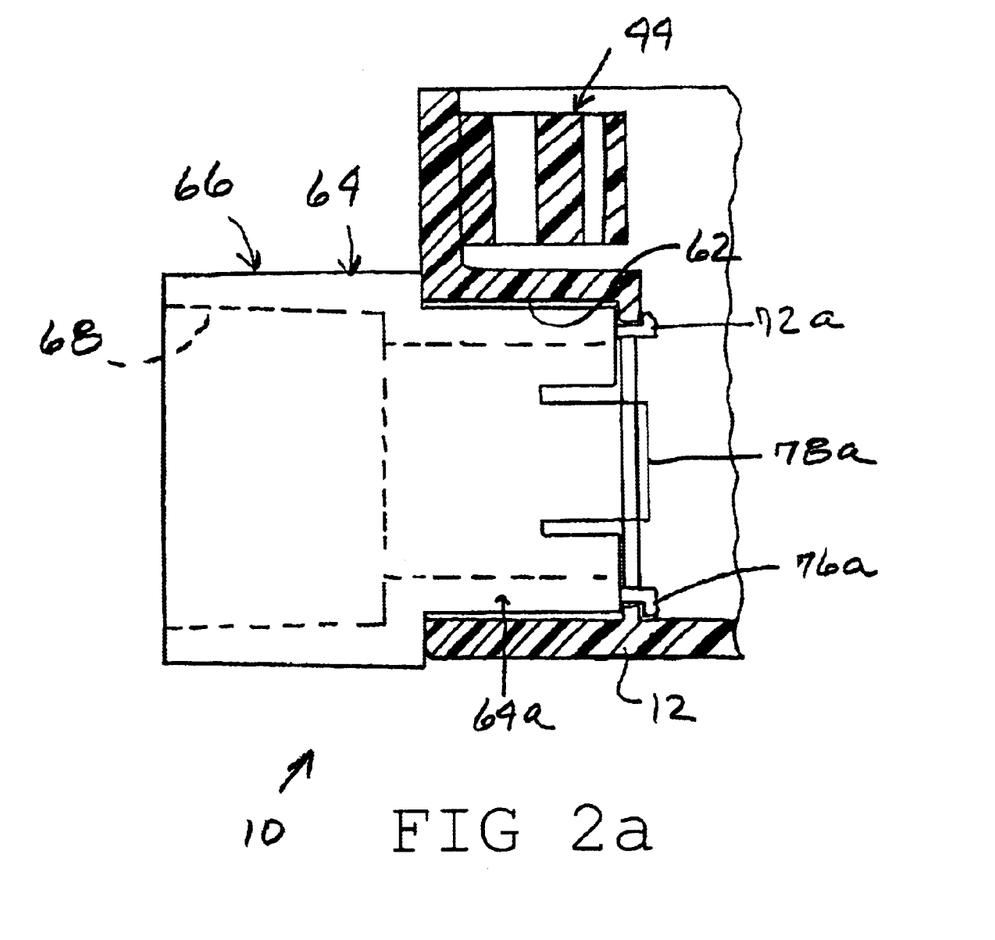
FIG. 2a shows the parts of the junction box assembly as seen in FIG. 2, but with the parts assembled.
Figure 4:
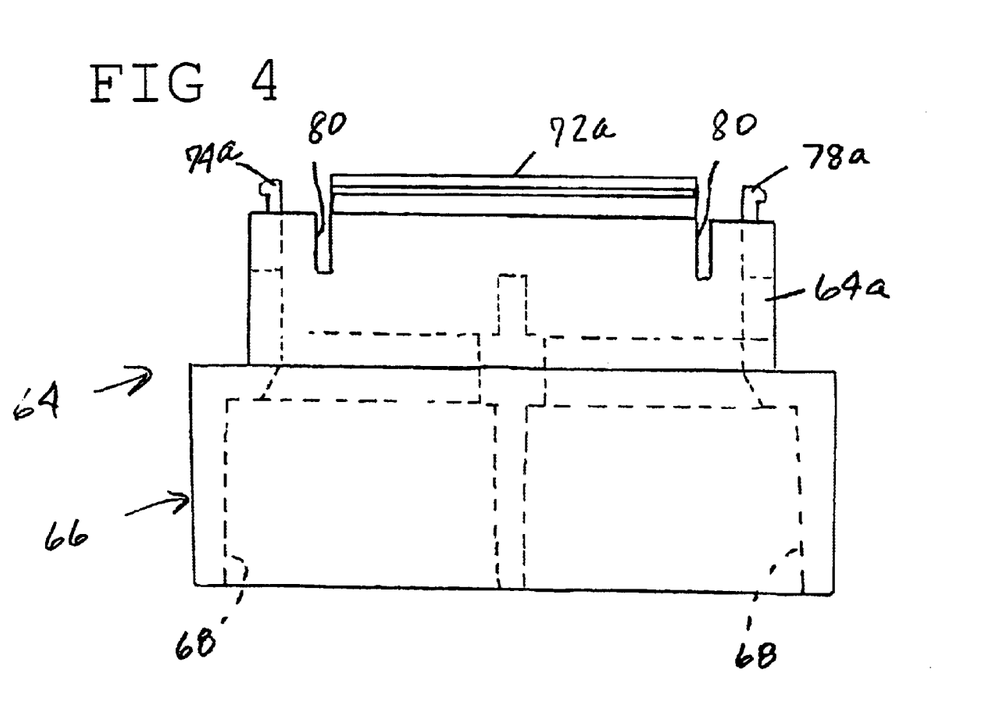
FIG. 4 is a plan view of an insert member by itself, as may be used with the junction box body seen in FIGS. 1, 2, and 3.
Figure 8:
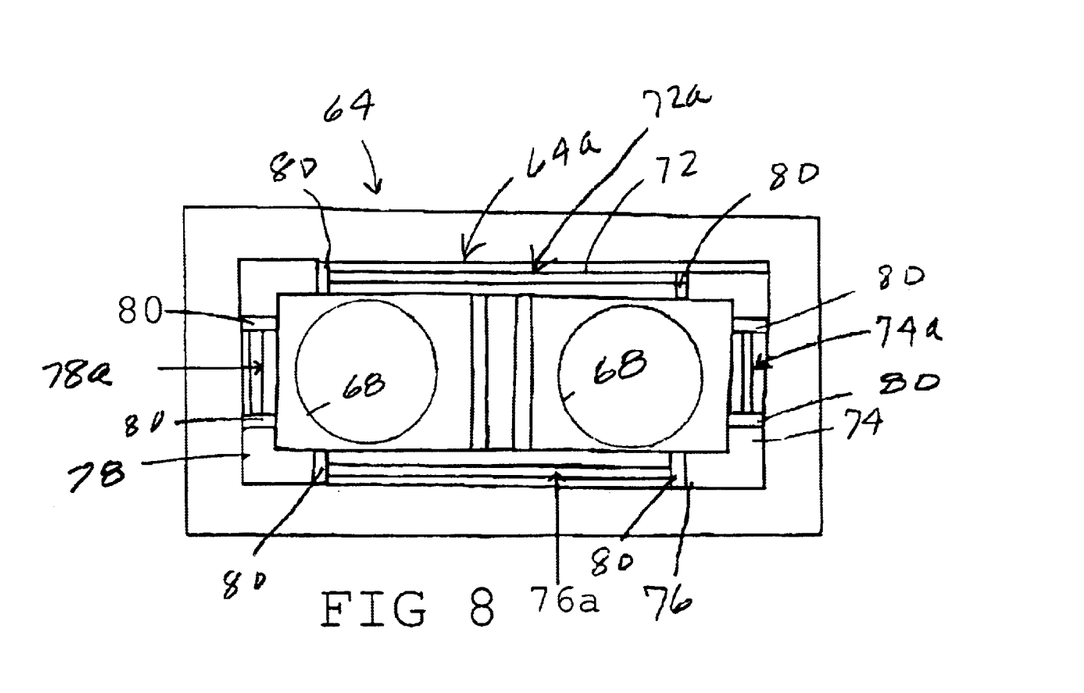
FIG. 8 is an end elevation view of an insert member, taken from the side of this insert member opposite to the direction of view of FIGS. 5 and 6.

As is best seen in FIGS. 2, 4, and 8, the insert member 64 has a rectangular body portion 64a, which is sized and shaped to be matchingly received into the insert recess 62. That is, as may be understood by a consideration of FIG. 2, the rectangular body portion 64a of insert member 64 is receivable into the portion 62a of the recess 62. Insertion of the portion 64a of insert member 64 into the portion 62a of recess 62 is indicated in FIG. 2 by the movement arrow 70. The body portion 64a is rectangular with two pairs of opposed spaced apart walls 72, 74, 76, and 78 (best seen in FIGS. 2, 4, and 8). These walls 72–78 preferably each carry and define a respective protruding integral latch portion 72a, 74a, 76a, and 78a. At each side of the latch portions 72a–78a, the walls 72–78 define one of a pair of notches or slots (each indicated with the numeral 80). The slots 80 provide for the latch portions 72a–78a to be sufficiently flexible that they can yieldably deflect slightly as the latch portion passes inwardly beyond the flange portion 62d, and allows the latch portions 72a–78a to spring outwardly in order to engage on the latching surface 62e, as is best seen in FIG. 2a.

In view of the above, it will be appreciated that a user of the junction box body 12 and insert member 64 selects the particular insert member it is desired to use. This selection may be made from among insert members that have various sizes of conduit sockets, viewing FIGS. 5 and 6, for example. The user then introduces the body portion 64a of the selected insert member 64 into the insert recess of a junction box body. The body portion 64a will slide freely into the insert recess portion 62a, until the latch portions 72a–78a encounter the chamfered surface 62c of the flange 62d. At that point, chamfered surfaces 72b–78b of the respective latch portions (best seen in FIG. 2) confront and engage the chamfered surfaces 62c of the respective part of the flange 62d (i.e., at the particular portion of the flange 62d confronting a particular latching portion 72a–78a). The confrontation and engagement of these chamfered surfaces results (upon the application of an axial force by the user), and as is illustrated by force arrow 82 of FIG. 2, in the latching portions 72a–78a deflecting sufficiently to allow them to pass inwardly beyond the flange 62d, after which these latching portions snap once again to their un-deflected position, and engage the flange 62d at surface 62e, as is seen in FIG. 2a. The result is that the insert member 64 is securely retained in the recess 62 of the junction box body 12, creating a junction box assembly as is seen in FIG. 1.

Figure 7:
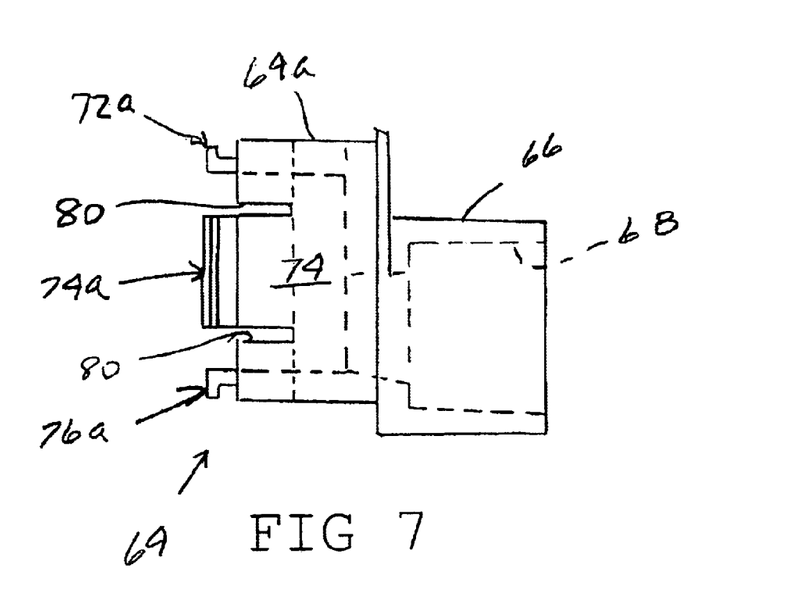
FIG. 7 is an exterior side elevation view of yet another alternative embodiment of insert member as may be used with the junction box body seen in FIGS. 1–3.

FIGS. 5 and 6 in contrast to one another illustrate that insert members may be proved with conduit sockets of differing sizes. FIG. 7 shows that the insert members may be provided with a bosses or with bosses 66m and with a conduit socket 68 (or conduit sockets) that are offset in the elevation plane from the center line of the insert body portion 64a. This offset has the effect of moving the conduits received into these conduit sockets with respect to the surface upon which the junction box assembly 10 is mounted. Although the offset shown in the insert member of FIG. 7 is with the conduit sockets offset downwardly, it will be understood that this insert member may be turned over and inserted with the conduit sockets offset upwardly. Thus, a user of the present inventive junction box has another choice and another degree of freedom resulting in a variety of configurations for the junction box. Further, the extent of such an offset of the boss(es) 66 and conduit socket(s) 68 may differ according to the wishes or requirements of a particular user of the junction box 10, and insert members 64 may be provided with configurations and offset dimensions embodying these differing offset requirements.

Figure 9:
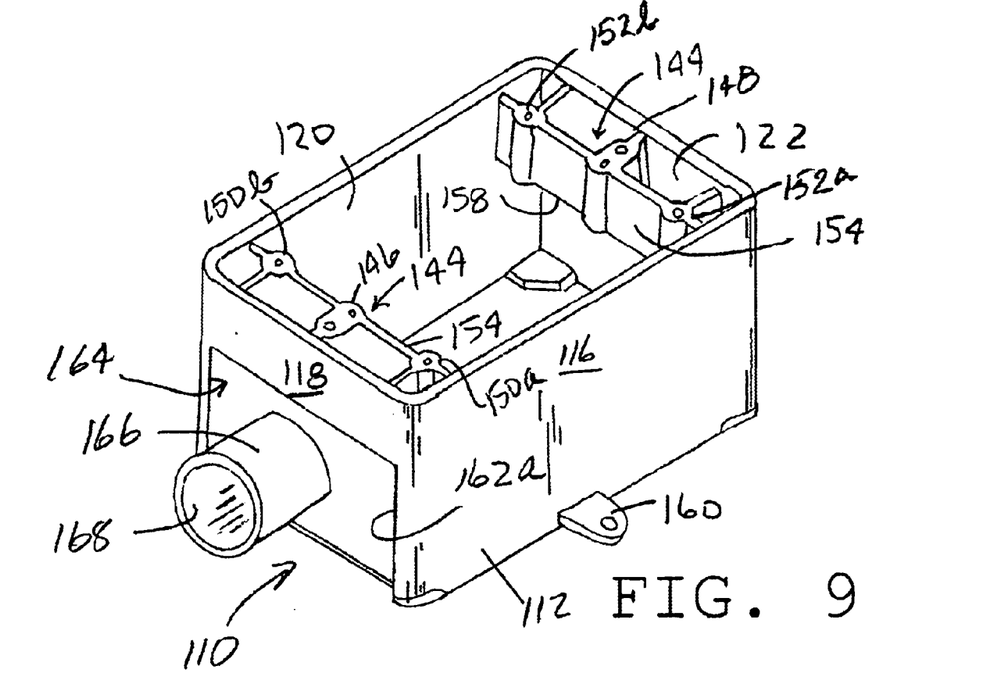
FIG. 9 provides a perspective view similar to FIG. 1, but illustrating an alternative embodiment of the inventive junction box assembly, including a junction box body and an insert member defining a single conduit socket.

Turning now to FIGS. 9–19 taken in conjunction with one another, and viewing first FIG. 9, an alternative embodiment of junction box assembly is shown. Because the embodiment of junction box assembly seen in FIGS. 9–19 has many features in common with the embodiment of FIGS. 1–8, or features which are analogous in structure or function to those features illustrated and described above, those features are referenced on FIGS. 9–19 using the same numeral used above, and increased by either one-hundred (100), or by two-hundred (200). Considering now FIG. 9, it is seen that the junction box assembly 110 has a body 112, which may preferably be injection molded of polyvinyl chloride (PVC), or of other thermoplastic or thermoset polymer materials known in the art. The body 112 includes a back wall 114, and plural contiguous walls 116, 118, 120, and 122. The contiguous walls 116–122 are joined integrally to the back wall 114, and are each also integrally joined to each of the two adjacent ones of the plural walls 116–122. Thus, these walls 116–122 are arranged in opposing pairs of generally parallel walls, and the adjacent walls are integrally joined to one another to four corner junctions 124, 126, 128, and 130.

Each of the walls 116–122 has a respective termination edge or end edge 132–138, which end edges are all substantially in a common plane. The walls 114–122 of the junction box 110 cooperatively bound a cavity 140, and also cooperatively define an opening 142 to this cavity 140 within junction box 110. The end edges 132–138 circumscribe this opening 142. In other words, the opening 142 provides access to the cavity 140 formed within the junction box 110 by the cooperation of the back wall 114 and the side walls 116–122.

Figure 10:
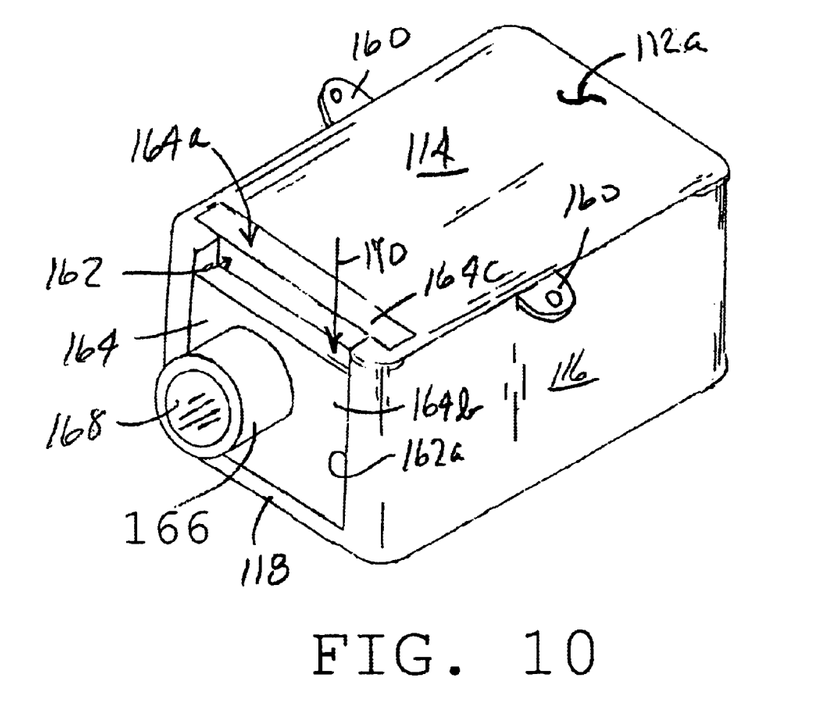
FIG. 10 is a perspective view of the bottom side of the junction box assembly seen in FIG. 9, and illustrates the T-shaped recess.
Figure 11:
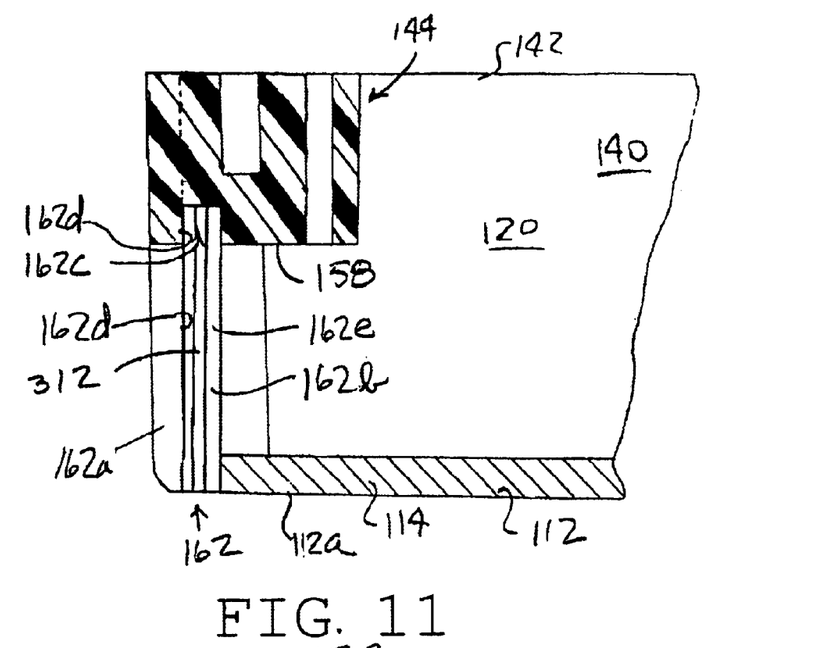
FIG. 11 is a fragmentary side elevation view, partly in cross section, of the junction box body seen in FIGS. 9 and 10, but is shown without the insert member installed.
Figure 12:
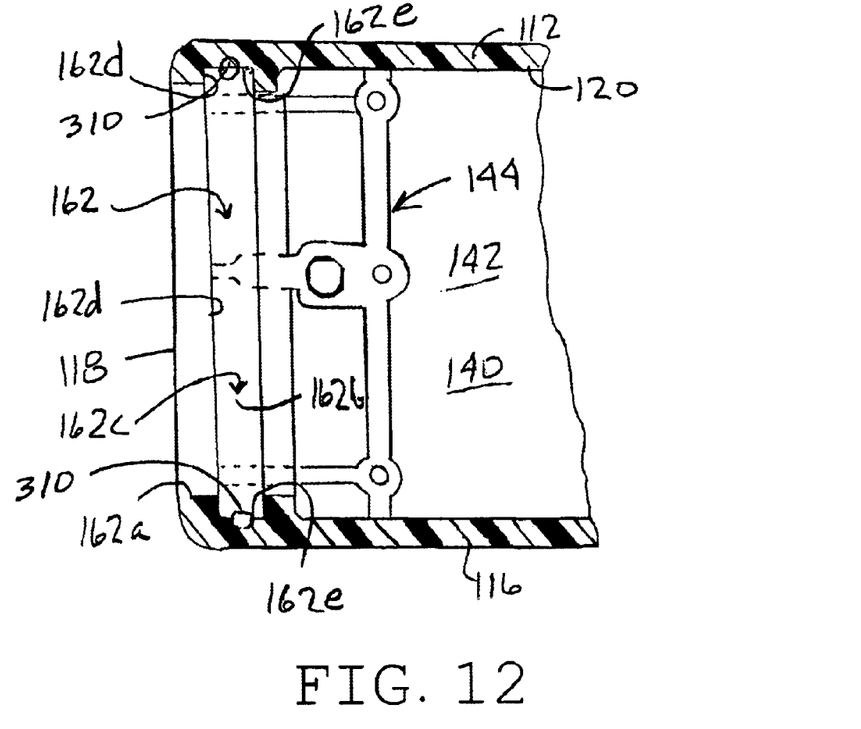
FIG. 12 provides a fragmentary plan view, partly in cross section, taken from the underside of a junction box body as is seen in FIG. 9, and the direction of view is upwardly, showing the T-shaped recess.

Turning now to consideration of FIGS. 9 and 10 in greater detail, it is seen that the junction box assembly 110 also includes a plurality of inwardly extending mounting lugs generally indicated at 144, and which are connected to the other mounting lugs at that end of the junction box 110 by an integral web 154, and are cantilevered from a respective one of the end walls 118, 122, and/or from side walls 116, 120. These mounting lugs are indicated with numerals 146–152b, and these define a respective termination surface 158, which is disposed toward but spaced from the interior surface of back wall 114.

Provided on each side wall 116 and 120, is one of a pair of outwardly extending mounting ears, 160, only one of which is visible in the illustration of FIG. 9, and both of which are visible in FIG. 10.

Further to the above, and viewing FIGS. 9 and 10 in conjunction with one another, it is seen that the end wall 118 closest to the viewer of FIGS. 9 and 10 defines a generally T-shaped insert recess 162, which extends laterally of the length of the junction box body 112. That is, the insert recess 162 is T-shaped and extends from the back surface of the junction box body (surface 112a as is seen in FIG. 10) toward but short of the opening 142 into the cavity 140 of the body 112. This insert recess 162 is defined only in wall 118 according to the embodiment illustrated in FIGS. 9 and 10, although the invention is not so limited. Further, as is seen in FIGS. 9 and 10, in end elevation view of the body 112, the recess 162 presents a generally rectangular opening 162a. As is further seen in FIGS. 11 and 12, the insert recess 162 extends from the surface 112a toward but short of the opening 142, and includes a larger (i.e., of greater lateral extent) portion 162b, which includes an upper portion or tongue 162c extending upwardly beyond the top of the opening 162a. The portions 162a and 162b of the recess 162 present an inwardly disposed shoulder 162d; and the portion 162b includes side surfaces 162e, which will be seen below to be usable as surfaces upon which a latching member may engage.

In FIGS. 9 and 10, an insert member 164 is shown received into the insert recess 162. This insert member defines at least one outwardly extending cylindrical protrusion or boss 166. The boss 166 defines a stepped cylindrical bore 168, which is sized and configured to adhesively receive an end portion of a plastic (i.e., PVC, perhaps) electrical conduit (not seen in the drawing Figures). Thus, the cylindrical bore 168 provides an outwardly disposed conduit socket, also indicated with the numeral 168. Again, as is seen in FIG. 1, any of the insert members used in conjunction with a junction box body of this invention in order to make a junction box assembly may define a pair (or more) of conduit sockets in side-by-side or other relationship. It will be also understood that the insert member 164 may define only a single conduit socket, or none at all (in which case the insert member would simply be for closing the insert recess 162).

Figure 13:
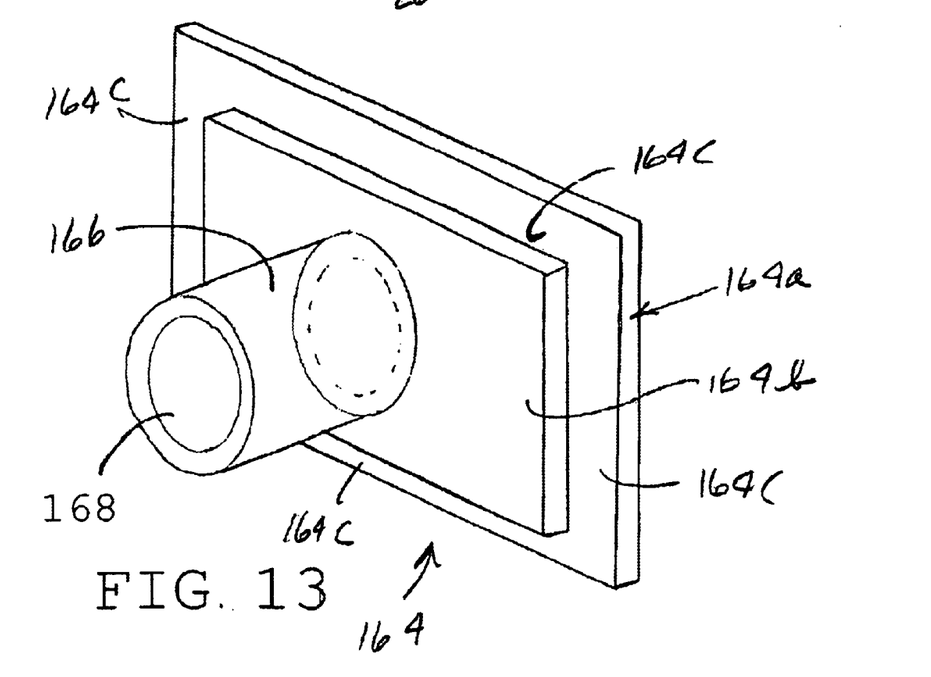
FIGS. 13 and 14 illustrate two alternative embodiments of insert members, each having T-shaped insert portions, and each of which may be used with the junction box body seen in FIG. 9.

Now, as is best seen in FIGS. 9, 10, and 13, the insert member 164 has a generally rectangular body portion (generally referenced with the numeral 164a), which is of T-shape in plan view (i.e., either from the top or bottom plan view), and which is sized and shaped to be slidably and matchingly received into the insert recess 162. That is, as may be understood by a consideration of FIGS. 10 and 13, the rectangular body portion 164a of insert member 164 includes a flange portion 164b, and a larger flange portion 164c, and these flange portions are slidably receivable into the portions 162a and 162b of the recess 162, as is indicated by the movement arrow 170 of FIG. 10. Considering for a moment an alternative embodiment of the invention, it is seen that insertion and latching of the portion 264a of insert member 264 into the portions 162a and 162b of a recess 162 is indicated also in FIGS. 17 and 18 by the movement arrows 170 (in those Figures indicating relative movement by the use of opposed arrows). The embodiment of the insert member seen in FIGS. 17 and 18 includes a latching feature, which will be further described.

But, continuing with a consideration of FIGS. 9 and 10, it will be understood that an embodiment of insert member 164 as is seen in FIG. 13 may be adhesively secured into the recess 162. This is done by applying an adhesive to the protruding side and upper parts of the flange portion 164c immediately prior to sliding the insert member into the recess 162. Viewing FIG. 13 it is apparent that the insert member 164 enjoys a symmetry about a horizontal line, so that the insert member may be inserted with either side "up" in the recess 162. The installer simply coats the side portions of the flange part 164c, and which ever part of flange part 164c is to go first into the recess 162, and slides the insert member into the recess 162. The adhesive coated "top" portion of the flange part 164c will go into the tongue part 162c of the recess 162. When this adhesive sets, the insert member 164 is secured permanently in the recess 162.

Figure 14:
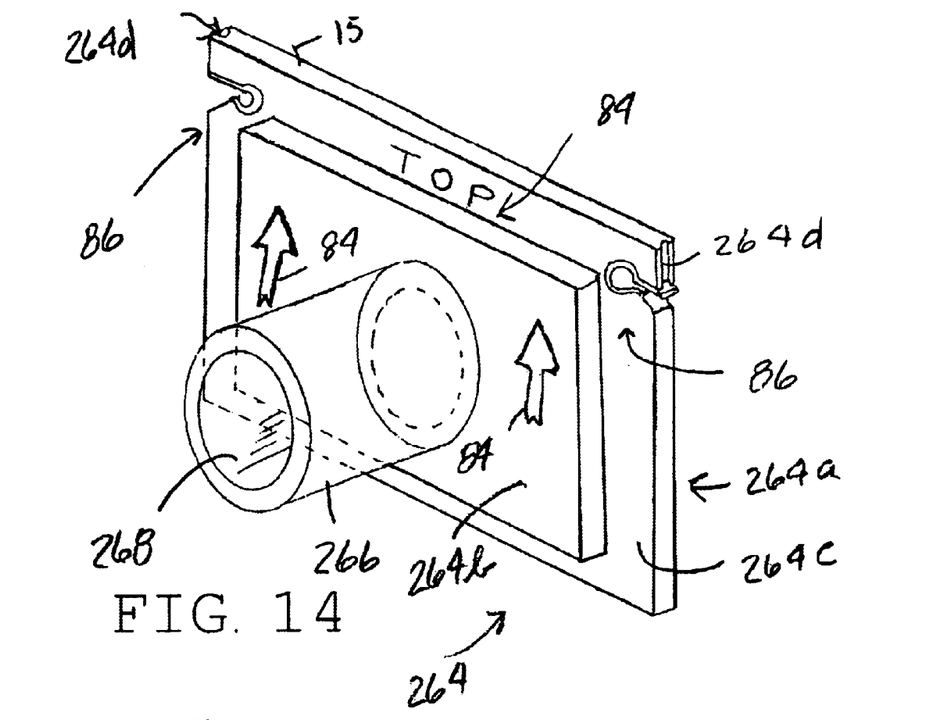

On the other hand, an embodiment of insert member 264 as is seen in FIG. 14 may be simply slid into the recess 162, and will self-latch into this recess, as is further explained below. Further, provided that the junction box body 112 is provided with release features to be explained below (which release features are optional), then the insert member may also be removed in the event, for example, that the installer changes his plan for a particular installation and wants to use an insert member with different sizes or a different number of conduit sockets on a particular junction box body.

Viewing now the insert member 264 seen in FIG. 14, is first seen that this insert member is substantially the same as the insert member 164 seen in FIG. 13, with two important differences. First, the insert member 264 is provided with indicia 84 indicating the "top" of this insert member (that is, the side to be inserted first into the recess 162 of a junction box body 112). These indicia may include one or more words, such as the word, "TOP," which may be molded into the flange portion 264c. Also, the indicia 84 may include one or more arrows molded onto the flange portion 264b. By use of these indicia 84, the user of the insert member 264 knows how to place this insert member into the recess 264 of a junction box body 112. The second difference with the insert member 264 is that this insert member is provided with a pair of latching structures, each generally indicated with the numeral 86. Further, between the "top" edge of the flange portion 264c, and the latching structures 86, the flange 264c defines a half-round recess or groove 264d extending along this flange portion.

Figure 15:
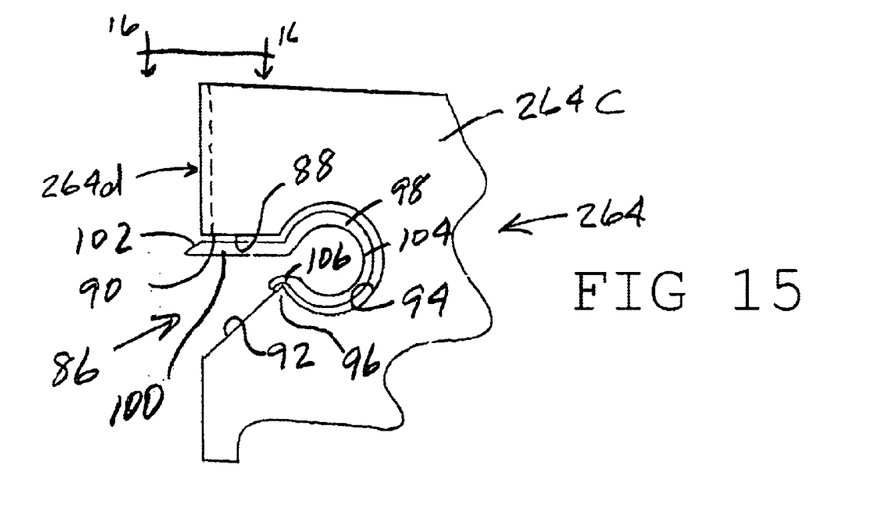
FIG. 15 provides an enlarged fragmentary view of an encircled portion of FIG. 14.
Figure 16:
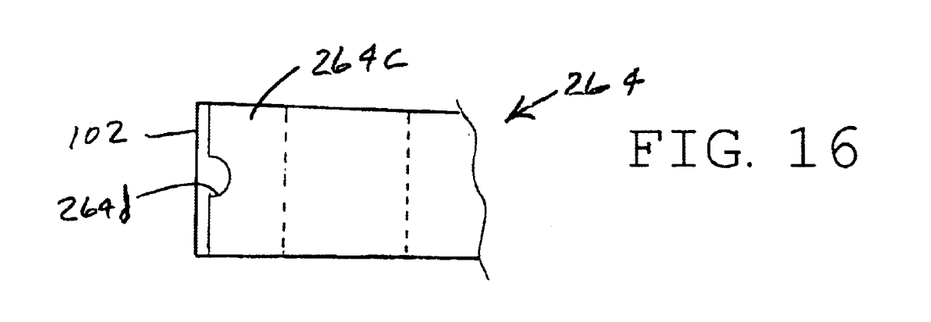
FIG. 16 is a fragmentary view taken at the line 16—16 of FIG. 15, and looking in the direction of the arrows.

Turning now to FIGS. 15–18, and first considering FIG. 15, it is seen that the latching structure 86 includes a "keyhole" shaped recess or hole 88 formed in the flange portion 264c of the insert member 264. This recess 88 includes an upper wall 90 which is preferably perpendicular to the side edge of the insert member. The wall 90 is opposed by a wall 92, which is angulated relative to the wall 90, and to the side edge of the insert member 264. The walls 90 and 92 are connected by a rounded portion 94 of the recess 88. Further, a transition surface 96 joins the rounded portion 94 with the angulated wall portion 92. Within this recess 88 is received a metallic latching member 98, which is preferably formed of spring steel flat stock or strip stock. This latching member 98 has a free or undistorted shape which is somewhat larger than the recess 88, so that the latching member 98 is forcefully distorted or sprung into the recess 88 to be retained therein by its own spring force. The latching member 98 includes a longer leg 100 which lies adjacent to wall 90, and which terminates in a protruding tooth portion 102. Latching member 98 also includes a rounded portion 104, which is received into rounded portion 94 of the recess 88, and a reentrant portion 106 that embraces transition surface 96 in order to secure the latching member 98 in recess 88.

Figure 17:
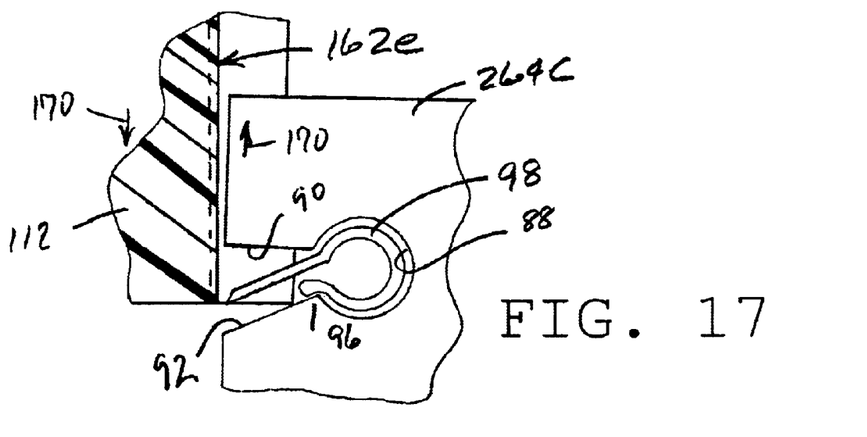
FIG. 17 is a fragmentary elevation view, partially in cross section, and showing a step in the process of inserting a T-shaped insert member portion of an insert member as seen in FIG. 14 into the T-shaped recess of a junction box body as seen in FIG. 9.
Figure 18:
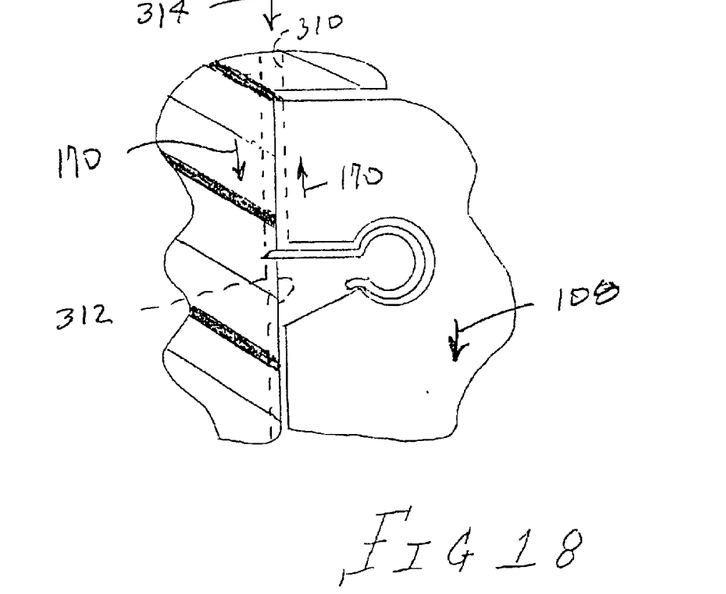
FIG. 18 is a fragmentary view similar to FIG. 17, but shows the latching of the insert member into the junction box body by engagement of a latch member carried on the T-shaped portion of an insert member.

As is seen in FIG. 17, when the insert member 264 is slid into the recess 162 of a junction box body 112, the tooth portion 102 slides along the surface 162e of the recess 162, allowing the insert member to slide into this recess. FIG. 18 shows the relative position of the insert member 264 and the recess 162 of a junction box body 112 after the insert member has reached full insertion into the recess 162. At that point, the user of the junction box 110 applies a withdrawing force 108 to the insert member, which results in the insert member 264 moving only slightly outwardly of the recess 162, upon which the tooth 102 digs into the surface 162e. The tooth 102 thus becomes embedded in surface 162e and permanently retains the insert member 264 in the recess 162 without the use of adhesives. Adhesive may be used with the insert member 264, however, in the event that additional securement or sealing of the insert member 264 in recess 162 is desired.

However, the junction box body 112 may also be provided with optional features allowing the insert member 264 to be removed from recess 162. Importantly, as will be seen, these "release" features allowing the insert member 264 to be withdrawn from the recess 162 are only accessible from within the cavity of the junction box assembly 110, so that there is no risk of the insert member 264 inadvertently being released from the junction box assembly. Further, as will be seen, releasing the insert member 264 from the junction box body 112 requires use of a couple of special "tools," as well as the application of deliberate action.

Figure 19:
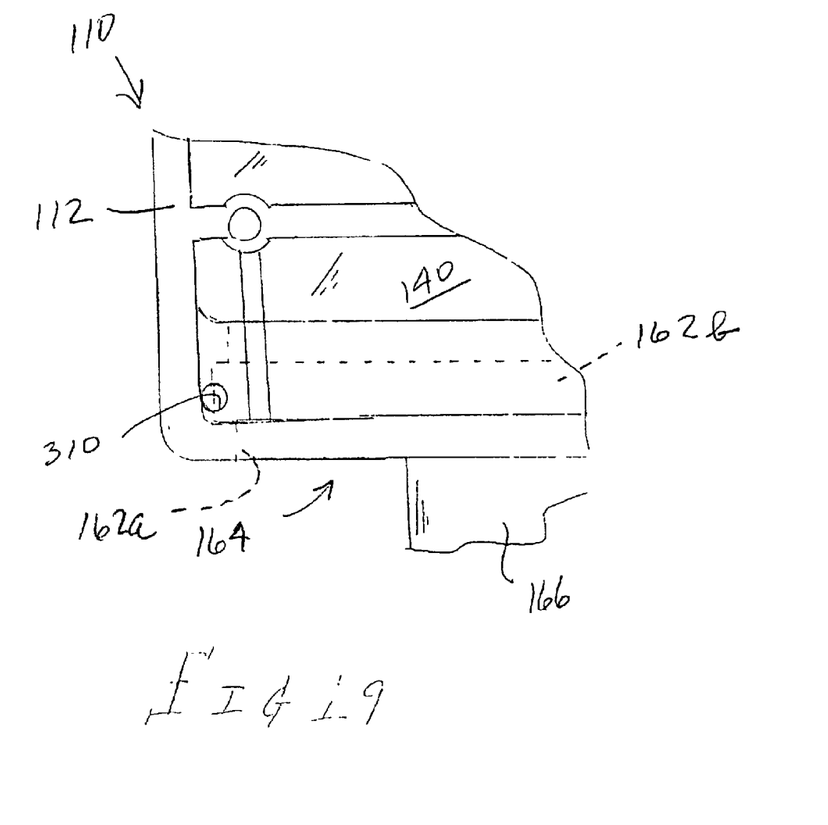
FIG. 19 provides a fragmentary plan view of a portion of the alternative embodiment of junction box, illustrating a provision for unlatching the insert member.

Considering now FIGS. 11, 12, 18, and 19, with attention first to FIG. 19, it is seen that the junction box body 112 may define a pair of holes 310 (only one of which is seen in FIG. 19) each opening from within the cavity 140 of the junction box to a respective end of the recess 162. These holes 310 align with and open to a pair of half-round vertical grooves 312 extending entirely along the surface 162e of the recess 162 (best seen in FIGS. 11 and 12). The groove 312 aligns with groove 264d, and these grooves cooperatively form a passage or hole extending to the tooth 102 of the latching member 98.

As can be appreciated by viewing FIG. 18, with the tooth 102 in the latching position shown (i.e., embedded in surface 162e), if a user of the junction box assembly 110 inserts a long thin pin drift, or a long piece of stiff wire through each of the holes 310 (i.e., two pin drifts or two pieces of wire are required) and along the grooves 312/264d (as is indicated by arrow 314 in FIG. 18), then this pin drift or wire can be used (possibly along with a slight upward movement of the insert member 164) to cooperatively force the tooth 102 out of its latching position and back to the position seen in FIG. 17 in which the tooth is not engaged with surface 162e. With the two latching teeth 102 of each of the two latching structures 86 so disengaged from the junction box body 112, the insert member 264 can be slid out of the recess 162.

But, it will be understood that the deliberate action (i.e., maintenance of the withdrawing force on the pair of pin drifts or on the pair of wire pieces, as well as coordinated movement of the insert member 264 out of recess 162, must be maintained entirely along the length of movement of the insert member 264 out of insert recess 162. This is the case because the latching members 98 are resilient spring steel parts and strongly urge the teeth 102 toward engagement with the junction box body 112. Thus, the insert member 264 is not removed from the body 112 except by deliberate action. However, by knowing and deliberate action, the user of a junction box assembly 110 using the insert member 264 as illustrated, and a junction box body 112 which is provided with the optional "release" features (FIGS. 11, 12, and 17–19) may remove the insert member 264 from insert recess 162 of the body 112. After the insert member is thus removed from the insert recess 162, it may be replaced by another insert member of a different configuration, if that is desired.

Those skilled in the art will further appreciate that the present invention may be embodied in other specific forms without departing from the spirit or central attributes thereof. Because the foregoing description of the present invention discloses only particularly preferred exemplary embodiments of the invention, it is to be understood that other variations are recognized as being within the scope of the present invention. Accordingly, the present invention is not limited to the particular embodiment which has been described in detail herein. Rather, reference should be made to the appended claims to define the scope and content of the present invention.

We claim:

1. An electrical junction box, said junction box comprising:
   a molded plastic junction box body including a back wall, and plural contiguous walls extending generally perpendicularly to said back wall, and each one of said plural contiguous walls joining integrally to the back wall and also to adjacent ones of said plural contiguous walls to cooperatively define a chamber within said junction box, and with said plural contiguous walls at respective end edges cooperatively forming an opening to said chamber;
   at least one wall of said junction box body defining an insert recess for slidably receiving an insert member which carries at least one conduit socket into which a termination portion of an electrical conduit may be secured;
   wherein said insert recess defined by said at least one wall is generally rectangular in elevation view, said insert recess including an outer portion of larger size, and an inner portion of smaller size, said inner and said outer portions cooperatively defining an outwardly disposed shoulder, whereby an insert member may be slidably received into said outer larger portion of said insert recess and may locate against said shoulder to position said insert member within said insert recess.

2. The electrical junction box of claim 1 wherein said inner portion of smaller size is defined by a peripheral flange part, said peripheral flange part outwardly defining said shoulder, and said peripheral flange part inwardly of said junction box body defining a latching surface.

3. The electrical junction box of claim 2 wherein said peripheral flange part further provides a chamfer surface adjacent to said shoulder, and said chamfer surface being disposed so that a latching portion of an insert member sliding into said insert recess encounters said chamfer surface and is deflected over said flange part to pass inwardly of said junction box along said insert recess and to thereafter engage said latching surface.

4. The electrical junction box of claim 1 wherein said insert recess defined by said at least one wall is generally T-shaped in a direction of view parallel with sliding movement of an insert member into said insert recess, said insert recess including an outer portion of smaller size, and an inner portion of larger size, said inner and said outer portions cooperatively defining an inwardly disposed shoulder, whereby an insert member having a portion which is also of T-shape matching said insert recess may be slidably received into said inner and said outer portions of said insert recess and may locate against said shoulder to position said insert member within said insert recess.

5. The electrical junction box of claim 4 wherein said insert recess includes an opening on a surface of said junction box, and a tongue recess portion at an end thereof opposite to said opening of said insert recess.

6. The electrical junction box of claim 4 wherein said insert recess includes a pair of opposite latch engagement surfaces.

7. The electrical junction box of claim 6 further including an elongate unlatching groove extending along each of said latch engagement surfaces from an opening of said insert recess to a closed end thereof.

8. An electrical junction box assembly comprising:
   a molded plastic junction box body including a back wall, and plural contiguous walls extending generally perpendicularly to said back wall, and each one of said plural contiguous walls joining integrally to the back wall and also to adjacent ones of said plural contiguous walls to cooperatively define a chamber within said junction box, and with said plural contiguous walls at respective end edges cooperatively forming an opening to said chamber;
   at least one wall of said junction box body defining an insert recess for slidably receiving an insert member which carries at least one conduit socket into which a termination portion of an electrical conduit may be secured;
   an insert member having a portion sized and configured to be slidably received into and retain in said insert recess, said insert member outwardly defining a boss having a stepped through bore, and said stepped through bore including an outer portion thereof which provides a conduit socket into which an end termination portion of an electrical conduit may be received;
   wherein both said insert recess and said insert recess member portion are generally rectangular in elevation view;
   wherein said insert recess of generally rectangular shape includes an outer portion of larger size and rectangular shape, and an inner portion of smaller size and rectangular shape, said inner portion and said outer portion cooperatively defining an outwardly disposed shoulder of rectangular shape, whereby said insert member may be slidably received into said outer larger portion of said insert recess and may locate against said shoulder to position said insert member within said insert recess.

9. The electrical junction box assembly of claim 8 wherein both said insert recess and said insert recess member portion are generally rectangular in elevation view.

10. The electrical junction box of claim 8 wherein said inner portion of smaller size is defined by a peripheral flange part, said peripheral flange part outwardly defining said shoulder, and said peripheral flange part inwardly of said junction box body defining a latching surface.

11. The electrical junction box of claim 10 wherein said peripheral flange part further provides a chamfer surface adjacent to said shoulder, and said chamfer surface being disposed so that a latching portion of an insert member sliding into said insert recess encounters said chamfer surface and is deflected over said flange part to pass inwardly of said junction box along said insert recess and to thereafter engage said latching surface, said insert member including a plurality of latching members each disposed on said portion there of to engage first said chamfer surface and thereafter to engage said latching surface upon insertion of said insert member portion into said insert recess.

12. The electrical junction box of claim 11 wherein said insert member portion includes fours walls in rectangular arrangement, each of said four walls carrying a respective one of said plurality of latching members.

13. A method of providing an electrical junction box, said method comprising steps of:
   providing plural walls for said junction box, and cooperatively arranging and interconnecting said plural walls so as to substantially bound a volume;
   utilizing an end edge of selected ones of said plural walls to cooperatively define an opening to said volume by which electrical components and electrical wiring may pass into and from said volume;

utilizing at least one wall of said plural walls of said junction box to define an insert recess, and configuring said insert recess to open outwardly from said volume, whereby said insert recess may receive a matchingly configured insert member which provides for joining to said junction box of at least one electrical conduit;

providing an insert member having a portion which is complementarily configured to and which is receivable into said insert recess, utilizing said insert member to define a boss and a stepped through bore, utilizing said stepped through bore to outwardly include a portion providing a conduit socket into which an end termination portion of an electrical conduit may be received and secured; and inserting and securing said insert member into said insert recess;

further including the steps of providing for said insert recess to include a larger sized portion opening outwardly on said junction box, and a smaller sized portion opening inwardly of said junction box to said volume, and utilizing said larger sized portion and said smaller sized portion to provide an outwardly disposed shoulder within said insert recess.

14. The method of claim 13 further including the step of providing for said insert recess to have a rectangular shape in elevation view.

15. The method of claim 13 wherein the step of securing said insert member within said insert recess includes a step selected from the group consisting of:

utilizing an adhesive upon said insert member, and providing mutual latching features on said insert member and on said junction box body, which mutual latching features engage upon insertion of said insert member into said insert recess.

* * * * *